Jan. 5, 1965     J. R. ALBURGER     3,164,006
EVALUATION PERFORMANCE OF LIQUID PENETRANT TRACER MATERIALS
Filed April 16, 1962

INVENTOR.
JAMES R. ALBURGER
BY
Attorney

United States Patent Office 3,164,006
Patented Jan. 5, 1965

3,164,006
EVALUATION PERFORMANCE OF LIQUID
PENETRANT TRACER MATERIALS
James R. Alburger, 5007 Hilliard Ave., La Canada, Calif.
Filed Apr. 16, 1962, Ser. No. 187,876
10 Claims. (Cl. 73—53)

This invention relates to the testing and evaluation of performance of liquid penetrant tracer materials.

Penetrant tracer processes are employed for the purpose of detecting various kinds and sizes of surface flaws or defects in machine parts, ceramics, welded joints, and the like. The processes involve immersing the part to be tested in a penetrant liquid containing a dissolved dyestuff which imparts either a visible color or a fluorescent color or characteristic to the liquid. The penetrant liquid enters any surface flaws which are present, and after the part is cleaned by a suitable solvent, emulsifier or washing step, entrapments of the dyed penetrant liquids remaining in surface flaws can be seen by appropriate inspection methods, thus revealing the location and in many cases the character, shape, and width of the flaws.

In cases where a flaw is relatively large, a relatively large amount of tracer may become trapped in the flaw, and resulting tracer indications may be observed easily. However, where a flaw is quite small, the tracer indication is less easily seen, and in some cases may not be visible at all.

It has been found that all dye penetrant flaw tracers exhibit a property of dimensional sensitivity whereby there exists a critical thickness of a film of the tracer liquid below which a fluorescence or color response cannot be seen. In addition, it is possible to accurately control the so-called dimensional sensitivity of liquid tracer materials, and I have described and claimed methods and means to this end in an abandoned copending application, Serial No. 149,061, filed October 31, 1961, a continuation-in-part of my application Serial No. 82,374, filed January 13, 1961, now abandoned.

Inasmuch as the ability of a flaw tracer dye penetrant material to reveal the presence of small flaws in the surface of a part may vary over a wide range of dimensional sensitivities, it often becomes necessary to evaluate the flaw detection efficiency or performance of the penetrant so as to be sure that it is functioning properly. For this purpose, a standardized and reproducible testing device is essential so that simulated flaws may be obtained which lie in a range of sizes likely to be encountered in practical flaw inspection processes and procedures.

In a manner similar to the penetrant method for detecting surface cracks or flaws, a fluorescent solder flux tracer method may be used to detect soldering defects, such as porosities, cold solder joints, soldering flux residues, and the like, so it is desirable that a testing device for the evaluation of liquid tracer flaw detection efficiency should be adaptable for convenient use on a wide variety of liquid tracer types, including the important penetrant and solder flux tracer materials.

The principal object of the invention, therefore, is to facilitate the testing or evaluation of performance of liquid penetrant tracer materials.

Another object of the invention is to provide an improved testing method which will simulate typical surface flaws over a range of useful dimensions.

A further object of the invention is to provide an inexpensive device which may be re-used repeatedly to give reliable and reproducible flaw indications in the evaluation of various dye penetrant or dye solder flux tracer materials.

A still further object of the invention is to provide a method of and means for evaluating and comparing the flaw detection capabilities of various liquid penetrant materials.

A better understanding of this invention may be had from the following description when read in conjunction with the accompanying drawings, in which.

Figure 1:
FIG. 1 is a side elevational view of one type of test block.

In the past, efforts have been made to make standard test blocks by creating thermal cracks in blocks of metal, by clamping two smooth blocks together to provide a tight crack between the blocks, or by electroplating various metals such as cadmium or hard chrome on metal panels and allowing cracks to form on the surface of the panels. None of these methods have been found to be readily reproducible or sufficiently inexpensive to be practical over a wide range of user applications. Many types of unglazed ceramic surfaces which, to a casual inspection, appear to be non-porous, actually contain on their surfaces multitudes of minute pores or pits which may have widths and depths on the order of 500 millimicrons or less. Furthermore, a desired ceramic surface characteristic can be reproduced so as to provide a consistent quality and statistical distribution of the pits and pores.

For example, I find that a so-called 85% silica ceramic, containing 85% of a silica and 15% of a clay material, will after firing and in its unglazed state have a surface containing thousands of tiny pores per square inch. These small pores are not all the same size and appear to range from perhaps 500 millimicrons in depth to perhaps 20 millimicrons. These dimensions are in the range of dimensional sensitivities of penetrant inspection materials described in the above-mentioned copending patent application.

Thus, I utilize as a test block a certain ceramic surface which will provide a test for penetrant inspection materials within a certain range of sensitivities, the surface of such a block having pores in the neighborhood of 10 to 25 per square millimeter. Such a block will have pores of different sizes, the large pores being indicated with less sensitive penetrant materials while the smaller pores will be indicated with more sensitive materials until a certain level of sensitivity of the materials is reached. To test materials of higher sensitivities, another form of test block is used.

Referring, now, to the drawings in which the same reference numerals indicate the same elements, a ceramic disc 5 may be of the order of one or two inches in diameter and a quarter of an inch thick with the preferred composition 85% silica and 15% of the clay material.

Figure 2:
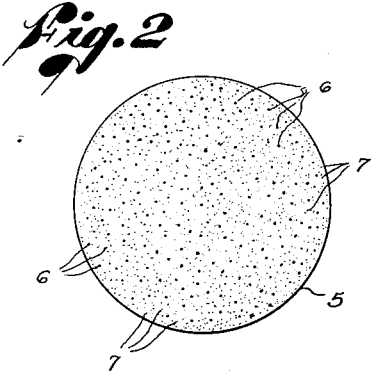
FIG. 2 is a plan view of the test block shown in FIG. 1 in which the manner of indicating sensitivity is indicated.

To prepare the ceramic block 5 in FIGS. 1 and 2, the mixture of silica and clay is fired at a temperature of the order of 80% of the absolute melting temperature of the silica which binds the mixture into a solid body. At such temperatures, the amplitudes of thermal vibrations of the atoms in the crystal lattices approach the dimensions of the distance separating adjacent compacted grains so that a continuous network of crystals is formed.

To perform the test, the test block is cleaned by immersing it in a suitable solvent, such as alcohol, to dissolve and flush out any entrapments of flaw tracer material. The immersion time is of the order of a few minutes, although with some higher sensitivity fluorescent tracers, this time may be increased. The test block, when not in use, is kept in a sealed, shallow jar covered with alcohol. To use the block, it is dried off with an absorbent tissue to present a dry surface to the penetrants to be tested. To obtain an indication of the sensitivity of a tracer material, it is necessary to smear the block with the material to be tested, then clean the excess tracer material from the surface of the block in any suitable manner, and then observe the tiny pinpoints of color in the case of a visible dye tracer or of fluorescence in the case of a fluorescent dye tracer. The higher the dimensional sensitivity of the dye tracer, the more points of color can be seen. If smears of two different liquid tracers are applied side by side on the same ceramic test block, any differences in the particular color or brightness of the pinpoint indications can immediately be seen and compared. Thus, the relative performance capabilities of two tracer materials can be judged with satisfactory accuracy. Low sensitive tracers are indicated only by the number of larger flaws or pores in the surface of the block, such as shown at 6 in FIG. 2, while more sensitive tracers will be indicated by the increased number, color and brightness of the pinpoint indications, such as shown at 7 in FIG. 2. Thus, according to the size and number of surface flaws, it is realized that when all flaws or pores have been indicated by a certain penetrant material, any penetrant materials having a greater sensitivity will not be measurable or indicated on such a ceramic test block. These pores and flaws may range and be in the neighborhood of 20 millimicrons in depth to perhaps 500 millimicrons.

Figure 3:
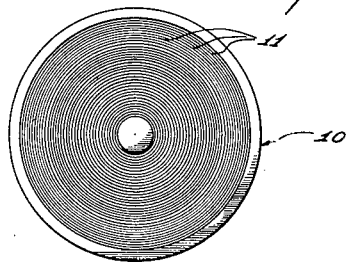
FIG. 3 is a plan view of another test block for higher sensitivity penetrant materials.
Figure 4:
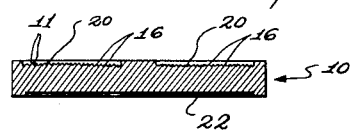
FIG. 4 is a cross-sectional view of the test block shown in FIG. 3 and taken along the line 4—4 of FIG. 3.
Figure 5:
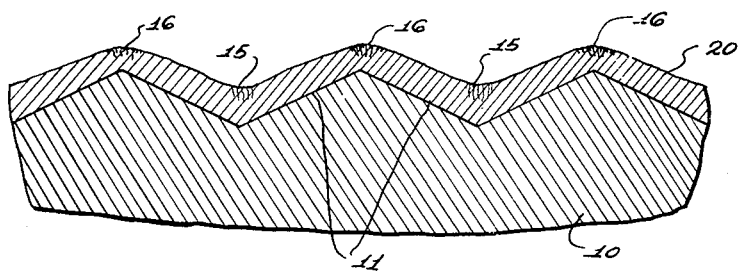
FIG. 5 is an enlarged detail view of a portion of the test block shown in FIGS. 3 and 4.

To obtain measurements and tests of higher sensitivity tracer materials, the type of test block shown in FIGS. 3 to 5, inclusive, is used. The test block or disc 10 shown in these figures is comparable in size to the disc 5 shown in FIGS 1 and 2, block 10 having a series of either parallel or spiral grooves 11 shown in cross-section in FIG. 4 and enlarged in FIG. 5. The distance between crests of the grooves is of the order of .002 inch, and the depth of the grooves is of the order of .001 inch. The block may be of an appropriate metallic material. The serrated surface on one side and the smooth surface on the other side of block 10 are recessed to protect these surfaces.

To produce such a test block, there is deposited or coated on the surface of the grooves one or more layers of ceramic-like film, which may be purified metal oxides such as alumina ($Al_2O_3$), beryllia (BeO), magnesia (MgO), thoria ($ThO_2$), titania ($TiO_2$), urania ($UO_2$), and zirconia ($ZrO_2$).

These metallic oxides may be applied to the surface by chemical action at elevated temperatures, in which case the block is made using the desired metal. Certain metals, such as molybdenum, may be reacted with silicon chloride at elevated temperatures to form a di-silicide ceramic-like coating. Also, many metals, as for example aluminum, may be treated electrochemically to produce a ceramic-like oxide or hydrate anodic film coating. The ceramic-like film which is formed on the surface of the block 10 is thus grown chemically or electrochemically to a thickness which may be on the order of a few thousandths of an inch. The grooves will thus be provided with rounded bottoms 15 and rounded tops 16.

As the ceramic-like film grows chemically on the surface of the block, its crystalline structure will vary depending on the orientation of the metal surface. Any discontinuity in the surface on which the oxides are deposited, such as the points 15 and 16 shown in FIG. 5, will cause the grains to assume various directions and provide small flaws or pores of the order of 100 millimicrons in depth to perhaps 10 millimicrons and possibly less. Thus, a surface is obtained which will provide tests for penetrant materials having higher sensitivities than those which may be tested with ceramic disc 5. Such a test block is suitable for a certain range of sensitivities of oil-phase penetrants or certain so-called "inverted system" penetrants which have sensitivity index values of the order of 100 or more which cannot be evaluated with the silica type ceramic block shown in FIGS. 1 and 2.

For testing extremely high sensitivity penetrant materials, the smooth side of disc 10 is utilized by coating the surface with any of the above-mentioned oxide materials as shown at 22. This provides a very smooth surface in which the flaws or porosities are of the order of 100 millimicrons to 10 millimicrons.

The above three types of surfaces thus provide a device for testing penetrant material having a very wide range of sensitivities. For normal sensitivity materials, the ceramic disc is satisfactory and particularly inexpensive. The higher sensitivity materials may be tested with the other two surfaces described above, which may be slightly more costly but still relatively inexpensive. It is to be noted that all of the three types of surfaces described may be easily duplicated with a high degree of precision.

I claim:

1. A method of evaluating the flaw detection performance capability of a liquid tracer which includes applying a certain tracer to be tested to a surface containing a uniform predetermined statistical distribution of small pits and pores, removing the excess liquid tracer from the surface and observing the number, color, and brightness of tracer entrapments in said pits and pores, the number, color, and brightness of said tracer entrapments being reproducible with the same tracer using different blocks of the same type.

2. A method in accordance with claim 1 in which the depths of said pits and pores range from 500 millimicrons to 10 millimicrons.

3. The method of evaluating the flaw detection performance capabilities of two liquid tracers which includes simultaneously applying said tracers to be tested to a surface containing a uniform predetermined statistical distribution of small pits and pores, removing the excess liquid tracer from said surface and comparing the tracer entrapments which remain in the pits and pores to which said respective tracers have been applied.

4. A method in accordance with claim 3 in which the depths of said pits and pores range from 500 millimicrons to 10 millimicrons.

5. A test block for evaluating the performance capabilities of liquid penetrant tracer materials comprising a solid block, said block having a ceramic-like surface having a uniform predetermined statistical distribution of pits and pores of a depth ranging from substantially 500 millimicrons to substantially 10 millimicrons.

6. A test block in accordance with claim 5 in which said block has pores from substantially 10 per square millimicron to substantially 25 per square millimicron on the surface thereof.

7. A test block in accordance with claim 5 in which said block has a composition of substantially 85% silica and substantially 15% of clay material.

8. A test block in accordance with claim 5 in which one surface of said block has grooves thereon spaced apart substantially .002 of an inch and of a depth of substantially .001 of an inch.

9. A test block in accordance with claim 8 in which the other side of said block has a relatively smooth surface coated with a metal oxide of a thickness of the order of .002 of an inch.

10. A test block in accordance with claim 9 in which said metal oxide is one in the group of alumina ($Al_2O_3$), beryllia (BeO), magnesia ($M_gO$), thoria ($ThO_2$), titania ($TiO_2$), urania ($UO_2$), and zirconia ($ZrO_2$).

References Cited by the Examiner

UNITED STATES PATENTS 2,340,940   2/44   De Forest _____ 73—104
2,478,951   8/49   Stokely et al.

RICHARD C. QUEISSER, *Primary Examiner.*

DAVID SCHONBERG, *Examiner.*